United States Patent [19]

Baus

[11] Patent Number: 4,615,090

[45] Date of Patent: Oct. 7, 1986

[54] FORMING TOOL FOR PRODUCING AN ENGRAVED MOTIF ON A SHEET

[76] Inventor: Heinz G. Baus, 35, Wartbodenstrasse, CH-3626 Hünibach-Thun, Switzerland

[21] Appl. No.: 707,686

[22] Filed: Mar. 4, 1985

[30] Foreign Application Priority Data

Mar. 8, 1984 [DE] Fed. Rep. of Germany ....... 3408419
Mar. 8, 1984 [DE] Fed. Rep. of Germany ....... 3408420

[51] Int. Cl.⁴ .................... B21B 27/02; B21B 13/02; B28B 11/08
[52] U.S. Cl. ........................... 29/121.8; 101/7; 264/284; 264/293; 425/363; 425/385; 428/187; 428/542.6
[58] Field of Search ............. 29/121.1, 121.8; 264/284, 293; 425/363, 385, 471; 101/6, 7; 428/187, 542.6

[56] References Cited

U.S. PATENT DOCUMENTS

| | | | |
|---|---|---|---|
| 2,856,323 | 10/1958 | Gordon | 264/284 |
| 3,177,558 | 4/1965 | Gronholz et al. | 29/121.8 |
| 3,294,014 | 12/1966 | Kneisel | 29/121.8 X |
| 3,302,592 | 2/1967 | Werner | 29/121.1 |
| 3,619,446 | 11/1971 | Navta | 264/284 |
| 4,062,918 | 12/1977 | Nakanose | 264/284 |
| 4,486,363 | 12/1984 | Pricone | 264/284 |

FOREIGN PATENT DOCUMENTS 2552547 5/1977 Fed. Rep. of Germany .
3135628 1/1985 Fed. Rep. of Germany .

*Primary Examiner*—Howard N. Goldberg
*Assistant Examiner*—R. S. Wallace
*Attorney, Agent, or Firm*—Schwartz, Jeffery, Schwaab, Mack, Blumenthal & Evans

[57] ABSTRACT

A forming tool for the production of sheets, more particularly from a thermoplastic synthetic material, is in the form of a roller, a press, or a casting mould, and comprises, upon its outer surface, engraving elements in predetermined spatial relationship with each other. It is to be possible to produce sheets inexpensively with this apparatus, and production tolerances are low. The engraving elements are provided upon the outer surface, which is made of hard material, more particularly metal. The engraving elements project, above the outer surface, to a predetermined height, and the remainder of the outer surface exhibits a predetermined surface structure.

23 Claims, 6 Drawing Figures

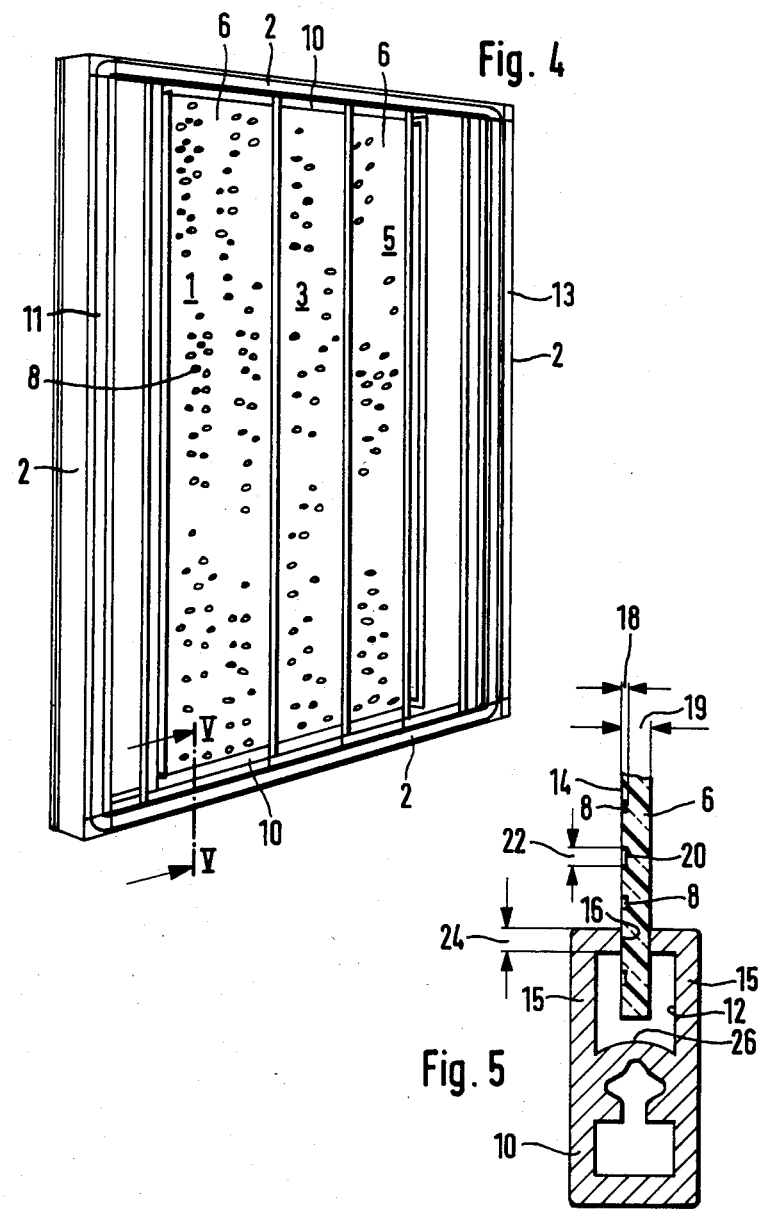

FORMING TOOL FOR PRODUCING AN ENGRAVED MOTIF ON A SHEET

The invention generally relates to an apparatus for the production of sheets, more particularly from a thermoplastic synthetic material. More specifically, the invention relates to a forming tool for use in such an apparatus, being preferably in the form of a roller, a press, or a casting mould, and comprising, upon its outer surface, engraving elements in predetermined spatial relation with each other. The invention furthermore relates to a sheet produced by an apparatus of this kind, more particularly for a shower-partition.

Described in German Pat. No. 31 35 628 is an apparatus for producing a sheet from a synthetic material, the said apparatus comprising, on its outer surface, elements in the form of depressions. This known apparatus may also have an otherwise smoothly polished outer surface, so that the finished sheet will likewise have a smooth surface. The known sheet comprises bosses projecting from its surface, corresponding to the depressions in the apparatus, these bosses having the shape of pearls or beads and looking, to an observer, like drops of water. With sheets of this kind, however, problems arise in connection with sealing and fitting them to profiled frames, as required particularly in the case of shower partitions. These pearl-like bosses, projections or bulges usually extend about 0.6 mm above the surface of the sheet, so that suitable sealing profiles, made of an elastomeric material, have hitherto had to be provided between the profiled frame and the sheet. Obtaining a satisfactory seal, and ensuring a firm seating of the sheet in a profiled frame, results in a comparatively large increase in production costs, especially in the case of sheets whose projections and bulges project to different heights from the surface of the sheet. High surface pressures arising in the vicinity of the bulges have led to damage. Moreover, the admissible production tolerances in the profiled rail must be watched since, in the worst cases, these add to the above-mentioned differences in height. Where the tolerances are excessive, satisfactory sealing and seating cannot be obtained with certainty.

German OS No. 25 52 547 describes a matrix for a press, the said matrix serving to form the depth-structures in a sheet. The known matrix comprises a metal body which is coated with a layer of synthetic resin. The outer surface of the forming tool is thus a layer of synthetic resin which has little resistance to abrasion and is not very suitable for effective mass production. The synthetic resin used hardens in a temperature-range of about 130° to 170° C. and is permanently resistant to heat only up to about 200° C. It is a known fact that the processing temperatures of thermoplastic synthetic materials are considerably higher so that the known apparatus cannot therefore be used for synthetic materials of this kind.

It is an object of the present invention to provide a forming tool by means of which sheets can be produced with lens-like areas, or the like, if possible below the surface of the sheet. The tool is inexpensive to produce and suitable for efficient production of sheets with the above-mentioned areas being provided, without difficulty, in desired spatial arrangement. The outer surface of the tool exhibits, in a simple manner, the desired surface condition. More particularly, it has a surface polished to a high gloss.

It is also an object of the invention to provide a sheet which, apart from depressions or cavities with pearl-like designs, comprises the desired surface finish, and above all a smooth surface is obtained. It is also possible therewith to produce such sheets inexpensively and in large numbers. It is further possible to fit a sheet into a frame made of profiled rails, and to produce such profiled rails at low cost and with low production tolerance requirements. It is also possible to obtain firm seating and sealing of the sheet in the aforesaid profiled frame.

In order to accomplish the above objects, the forming tool of the invention has an outer surface, made of hard material more particularly metal, from which surface engraving elements project up to a predetermined height, and the said outer surface furthermore has a predetermined surface finish.

The tool according to the invention exhibits the required finish structure in the outer surface. According to one advantageous embodiment, the engraving elements are arranged upon the outer surface only when the latter already possesses its required finish structure and, above all, when it has been polished to a high surface finish. During production, the outer surface is first of all provided with the necessary finish structure, after which the engraving elements are fitted. The said engraving elements are secured to the outer surface in a suitable manner, more particularly by welding, soldering, pressing or screwing into recesses. It is important, in these cases, that the outer surface exhibit the necessary finish structure before the engraving elements are secured. It is a simple matter, therefore, to prepare the outer surface with a surface finish of desired quality. This is of importance with a view to obtaining an outer surface polished to a high gloss. In order to ensure reliable attachment of the engraving elements, the latter are preferably screwed into threaded recesses. The height to which the engraving elements project from the outer surface may be predetermined, as required. The said recesses can be produced in the outer surface, in the required spatial relationship with each other, at comparatively low cost.

In one particular embodiment of the invention, the forming tool, in the form of a roller, a press, or a casting mould is obtained by removing a top layer of material while simultaneously leaving engraving elements to stand up a predetermined height from what has now become the outer surface of the tool, the engraving elements having upper end faces which are provided with structures or decorations, or are profiled, polished to a high gloss, or are flat, the parts thereof sunk farthest inwards lying, at least approximately, on a level with the second outer surface or thereabove. A forming tool of this kind can be produced at an economically acceptable cost, the engraving elements or projections exhibiting, without much difficulty, the predetermined spatial relationship with each other. For all configurations, it is important that the sheet to be produced by the apparatus exhibit, on the one hand, a specific surface finish structure and, on the other hand, that it exhibit, in the surface, structurally similar water-drops running down the sheet. According to the invention, removal of the top layer is obtained by etching or some comparable process, the engraving elements being simply left standing.

In one particular embodiment, the upper end faces of the engraving elements present structures, decorations and, more particularly, inwardly directed sinks, the parts thereof reaching farthest into the interior extending, at the most, as far as the outer surface. The height of the engraving elements, and the depth of the structures, decorations, or sinks, are matched in such a manner that corresponding structures, decorations, or also concave or convex sinks are formed on the finished sheet. The bottom surfaces of the said depressions may, without difficulty, also be designed to resemble pearls or drops of water. The engraving elements may be welded to the outer surface, soldered thereto, or inserted into recesses. In one preferred embodiment, the said engraving elements are in the form of pins. Hereinafter, therefore, the engraving elements will be referred to as pins, in spite of the fact that other configurations also lie within the scope of the invention. It should be pointed out that the forming tool may comprise a plurality of differently shaped pins. Since the pins project from the outer surface, the lenslike areas in the finished sheet are also located below the surface thereof. According to the invention, the most deeply sunken part is no deeper than the outer surface. Within the scope of this invention, the decorations, structures, and especially the sinks are formed on the upper end faces of the pins by driving or pressing them in with a suitable tool, more particularly a centre-punch, a pressure-ram, or the like.

In one particular embodiment, where the engraving elements are secured in threaded bores, the length of the thread in each bore is greater than the length of the thread on the pin, a part of the cylindrical surface of which is pressed into the thread in the bore. While the pin is being screwed in, the external thread thereof is first screwed into the thread in the bore until the cylindrical surface adjoining the external thread reaches the thread in the bore. As the pin is screwed farther in, the cylindrical surface is also drawn into the threads in the bore, where it is clinched. This is a particularly simple way of ensuring reliable locking.

In order to permit simple screwing-in or insertion of the pins, the latter are initially longer than is necessary with respect to their final height. They can therefore be securely held with tools, with no danger of damaging the outer surface of the tool when the pins are being screwed-in or inserted. After being screwed in, the pin projecting from the outer surface is shortened to the required height. The upper end-face of the remaining stub may then be provided with a sink as required.

In order to provide sinks in the pins at low production cost, the said sinks are fitted by driving or pressing them in with a centre-punch, a pressure-ram, a rivet-hammer, or the like. The fitting of the sinks requires extremely little equipment, the required depth of the sink being obtained by predetermining the force required to drive or press them in.

According to one particularly practical embodiment, the height of the engraving elements above the surface is 2 mm, preferably between 0.6 and 0.8 mm, and/or up to 40% of the thickness of the sheet to be produced. Furthermore, the diameter or width, i.e. their largest cross sectional linear dimension, must not exceed a maximum of 60 mm, but is preferably 20 mm and, more particularly, between 3 and 9 mm. Although the pins are preferably cylindrical they may, within the scope of the invention, also be of other cross-sectional shapes.

The sheet produced by means of the tool according to the invention comprises, in its surface which is polished to a high gloss, cavities with bottom surfaces arching upwardly in order to form the said lens-like areas, the part arched farthest up lying, at least approximately, in or below the surface of the sheet. Since the outer surface of the tool for producing sheets can easily be polished smooth, before the pins are inserted, the surface of the sheet is therefore also very smooth and flat, thus preventing, in a particularly practical way, any unevenness or other irregularity which might impair the surface quality of the sheet.

Such a sheet is particularly intended for use in shower partitions, the edges of the sheet being held by means of profiled rails and engaging in grooves therein. The pearl-like or structured areas are located in cavities under the surface of the sheet, which therefore rests with its surface flat against the wall of the groove in the profiled rail, thus ensuring the best possible sealing and firm support. Nor do the cavities themselves affect the seal, especially since the width or diameter of the above-mentioned pins or engraving elements, and therefore the cavities in the sheet, are matched, according to the invention, with the depth of the wall of the groove. The width or diameter of the cavity is less than the adjacent wall of the groove. As a result of the above-mentioned dimensioning of the engraving elements of the tool, the cavities in the sheet have corresponding dimensions. The sheet made according to the invention may be cleaned without difficulty, thus meeting the requirements of hygiene. The maximal depth of the cavities is preferably between 0.06 and 0.08 mm. With cavities of this design, the upwardly arched bottom surface may provide a structure resembling water-drops, but the danger of contamination due to deposits of lime or soap residues is relatively slight.

A description of preferred embodiments of the invention now follows, having reference to the accompanying drawing, wherein:

FIG. 4 is a perspective view of a shower partition, the door-elements of which comprise sheets with decorative cavities;

FIG. 5 is a cross-section along the line V—V of FIG. 4, the edge of the sheet being inserted into a profiled rail;

Figure 1:
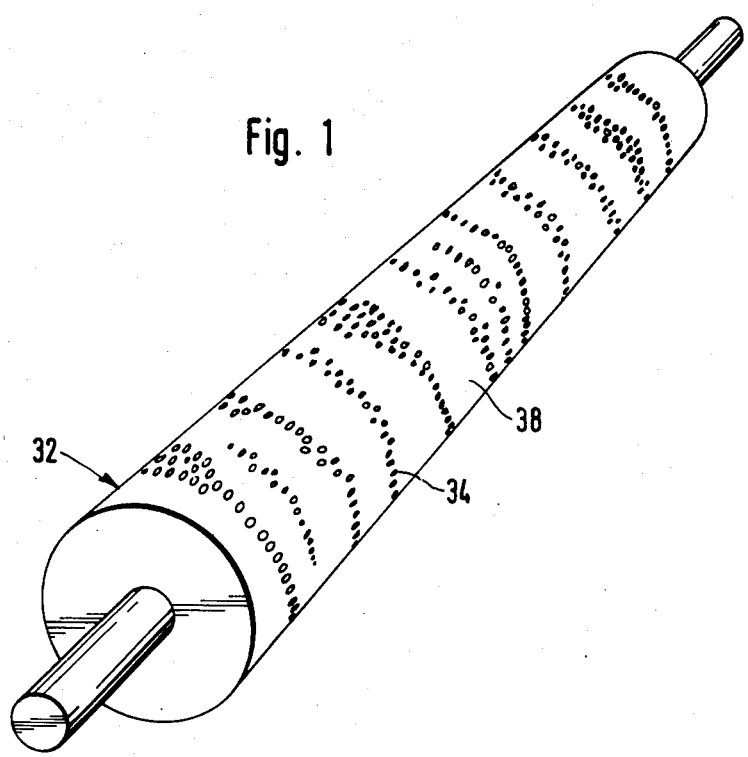
FIG. 1 is a perspective view of a forming tool in accordance with the invention.

FIG. 1 shows a forming tool in the shape of a roller 32 comprising engraving elements 34 in the form of pins 34 which project from the roller cylindrical outer surface 38. Several of such pins 34 are provided in specific geometrical relationship with each other, so that a sheet produced by means of the roller exhibits cavities resembling water drops dripping vertically down its surface. Outer surface 38 of roller 32 is polished to a high gloss.

Figure 2:
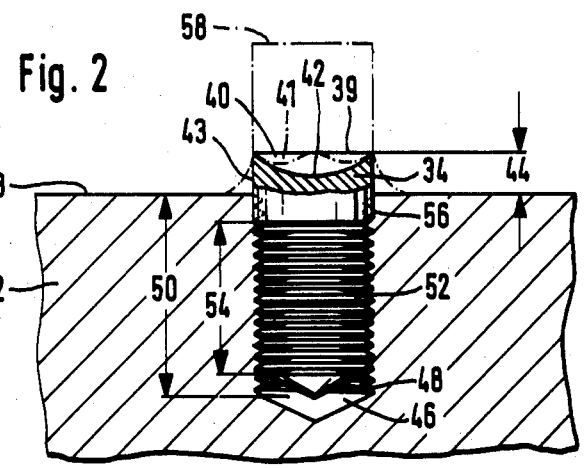
FIG. 2 is a cross-section, to an enlarged scale, through a portion of the surface of the tool according to FIG. 1.

FIG. 2 is a cross-sectional view through a top portion of the roller 32 and shows one pin 34. The latter projects from the outer surface 38 and contains a decorative sink or cavity 40 in its upper end face 39 which is directed radially outwardly. Instead of the sink shown, another structure, decoration, or the like may be provided in the end face 39 as indicated by the dotted lines. Moreover lateral wall 43 of the engraving element or pin 34 may also be of different contour, as shown by the dotted lines. Section 42, which is sunk radially farthest towards the interior, is located above the outer surface 38 and in fact, sunken portion 42 lies, at the most, approximately on a level with outer surface 38. Pin 34 is at predetermined height 44 above outer surface 38. Height 44 is, at the most 40% of the wall thickness of the sheet to be produced and is usually about 2, preferably between 0.6 and 0.8 mm. The part of the pin 34 projecting above outer surface 38 is preferably cylindrical but, within the scope of the invention, it may also have an oval or similar cross-section.

In the vicinity of the outer surface 38, roller 32 is formed with a bore 46 having an internal thread 48 of a length 50. External thread 52 of pin 34 is screwed into bore 46 but length 54 thereof is less than the said thread length 50. A small part 56 of the cylindrical outer surface of pin 34 is drawn into internal thread 48 in bore 46, and is thus firmly seated in the latter. It should be remembered that many such pins 34 are inserted into bores 46 in smoothly polished outer surface 38. During production, the bores 46 are drilled, at the desired locations, into outer surface 38, the necessary threads 48 also being cut. As may be gathered from FIG. 1, different pins may also be of different dimensions. The height of the pins 34 amounts, at the most, to about 0.6 to 0.8 mm. In order to avoid damage to the smoothly polished outer surface 38 while pins 34 are being screwed in, the said pins are initially considerably longer, as indicated by dotted lines 58. A pin 34 may be grasped and screwed into the roller 32 with a suitable tool, after which the pin 34 is shortened to the desired height 44. Finally, sink 40 is driven or pressed into the upper end face with a suitable tool.

Figure 3:
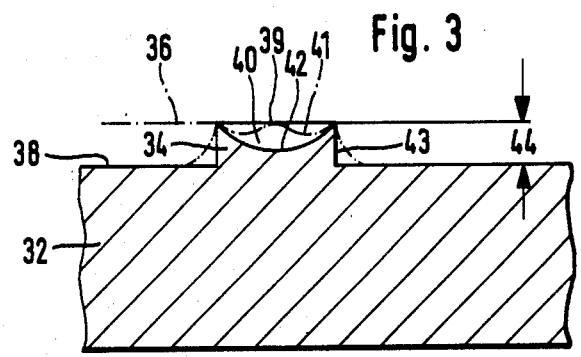
FIG. 3 is a cross-section, similar to that in FIG. 2, but through another embodiment of the tool.

FIG. 3 shows a cross-section through another embodiment in which engraving element 34 is solid with the body of the tool 32, being produced by removing specific areas of the roller 32. Here again it is essential that part 42 of the said engraving element, which is sunk farthest towards the interior, be located, at the most, on a level with outer surface 38 of roller 32. It should be pointed out that instead of the roller, a press, a casting mould, a matrix, or the like forming tool can be produced in the manner according to the invention. An initial outer surface layer 36, of which the upper boundary is indicated by the dotted line, is removed in a suitable manner. During this operation, certain areas are left standing to form engraving elements 34. The roller 32, or generally speaking, the forming tool, exhibits a correspondingly deeper second outer surface 38, after removal of the initial surface 36, above which engraving elements 34 project. The decorations, structure and, more particularly, the decorative sinks 40 are then formed into the upper end faces 39 of engraving elements 34 which have been left standing, this operation being effected by driving or pressing in a suitable tool, more particularly a centre-punch, a pressure-ram, or a rivet-hammer. The shape of sinks 40 is predetermined in the desired manner by the amount of driving or pressing force. It will be seen that this makes it possible to predetermine the shape of the pearl-like areas, and the bottom surfaces of the cavities in the sheet to be produced.

FIG. 4 is a perspective view of a shower partition consisting of a frame made out of four frame profiles 2 arranged at right angles to each other. Three door elements 1,3,5 are arranged displaceably along upper horizontal frame profile 2, guide means in the form of rollers or the like being provided (not shown). Moving the door elements opens or closes a passage through the frame to a shower stall or the like, as required. Each of the door-elements contains a sheet 6, preferably made of a thermoplastic synthetic material, in surface 14 of which cavities 8 are provided. These sheets are produced with the forming tool 32 described above. For greater clarity, cavities 8 are shown enlarged and, to an observer, the motif resembles drops of water. Door elements 1,3,5 also contain frames made out of four profiled rails 10 arranged at right angles to each other, in which sheets 6 are held. Inserted into visible surfaces 13 of frame profiles 2 are facing profiles 11. In such a shower partition, the proposed sheets 6 may be arranged, not only as shown in the door elements, but also in so-called lateral walls which are connected, to the left and/or right, to vertical frame profiles 2 in known fashion. It is precisely in the case of such lateral walls that proper sealing and firm seating, in every respect, of the sheets is necessary, so that the escape of water can be safely prevented under all conditions. Sheets manufactured according to the present invention are furthermore made of a transparent synthetic material. In the case of the said lateral walls, the profiled rails provided for the accommodation of the sheet 6 are also designed as frame profiles, in order to obtain a stable construction which meets static requirements.

FIG. 5 shows, to an enlarted scale, a cross-section of a sheet 6 made, according to the invention, from a thermoplastic synthetic material. The edge of sheet 6 is inserted into a groove 12 through a sidewall opening 16 in a profiled rail 10, surface 14 of sheet 6 bearing directly against the walls defining the opening 16. According to the invention, profiled rail 10 is in the form of a clamping profile, i.e. the sheet 6 is clamped between legs 15 with the walls defining the opening 16. The said sheet comprises cavities 8 which are produced by the pins 34 described hereinbefore. Each cavity 8 has a depth 18 of between 0.6 and 0.8 mm. Depth 18 amounts, at the most, to 40% of wall-thickness 19 of sheet 6. Bottom surface 20 is arched upwardly toward surface 14, corresponding to the sink, explained at the beginning hereof, in engraving element 34. The part of bottom surface 20 arched farthest upward projects, at the most as far as surface 14. In looking towards surface 14, cavity 8 may be either circular or may have an oval or comparable contour. For the purpose of imitating a drop of water on surface 14, according to this invention the width of the cavity may be greatest in the vertical direction. Cavity 8 has a diameter or largest width 22 of between 3 and 9 mm. Thickness 24 of wall 16 of the opening, which bears directly against sheet 6, is greater, according to the invention, than dimension 22 or the maximal width of the cavity 8. This ensures reliable sealing in all cases. If this condition were not met, water could pass downwardly over the cavity to bottom 26 of groove 12, and could then run at right angles to the plane of the drawing towards profiled rail 10, emerging at the end thereof. This is prevented by the configuration according to the invention.

Figure 6:
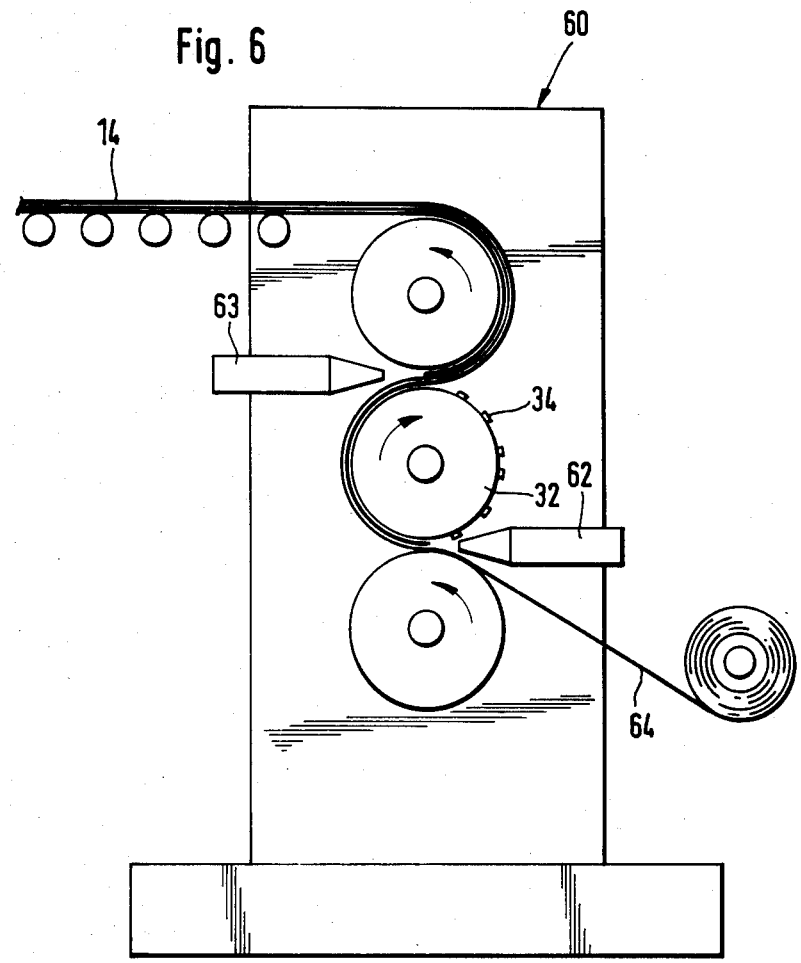
FIG. 6 is a diagrammatical representation in elevation, of an arrangement of rollers, one roller being a tool according to FIG. 1.

FIG. 6 is a diagrammatical representation of an arrangement 60 of rollers in the form of a roller-smoothing apparatus. This arrangement comprises a total of three rollers, central roller 32 corresponding to that shown in FIG. 1. Two wide slot nozzles 62,63 of extruders are shown diagrammatically, through which strips of thermoplastic synthetic material are introduced into the roller gaps. Actually, the one extruder nozzle 62 is sufficient according to the invention. Also fed to the said arrangement of rollers is a strip 64 of textile fabric which is embedded between the said strips of thermoplastic synthetic material. Roller 32 comprises greatly enlarged engraving elements 34 for producing depressions in surface 14. It need not be emphasized that the continuously produced strip emerging from the arrangement of rollers on the upper left hand side of the drawing, after cooling in the usual manner, may be cut into individual sheets as required. The essential characteristic is the integration of roller 32, made according to the teaching of the invention into an arrangement of rollers in which at least one wide slot nozzle delivers the thermoplastic material directly into a gap between two rollers, and engraving of the surface, with a minimal amount of energy, simultaneously with the production of the strip from which the sheet is then cut.

I claim:

1. A forming tool for producing an engraved motif on a sheet of material, said forming tool comprising a body having an outer surface and a plurality of engraving elements of predetermined height projecting outwardly of said outer surface and distributed on said outer surface according to a predetermined spacial arrangement, each said engraving element having an outer face on which is formed an inwardly curved depression of predetermined depth, the depth of each depression being less than the height of the engraving element on which the depression is formed.

2. A forming tool as claimed in claim 1, wherein said engraving elements have a curved outer contour in order to produce drop-like recesses in said sheet of material.

3. A forming tool as claimed in claim 1, wherein said outer surface has a surface finish which is a high gloss polish.

4. A forming tool as claimed in claim 3, wherein said body is formed with threaded bores opening outwardly onto said outer surface and said engraving elements are threaded pins screwed into said bores.

5. A forming tool as claimed in claim 3, wherein said body is formed with bores opening outwardly onto said outer surface and said engraving elements are pins welded into said bores.

6. A forming tool as claimed in claim 3, wherein said body is formed with bores opening outwardly onto said outer surface and said engraving elements are pins pressed into said bores.

7. A forming tool as claimed in claim 4, wherein said bores are threaded essentially along the full depth thereof, wherein said pins are threaded from the free ends thereof along a length shorter than said full depth of said bores, and wherein said pins are screwed into said bores with an unthreaded portion thereof, above said shorter threaded length, being force-threaded into said threaded bores.

8. A forming tool as claimed in claim 3, wherein said engraving elements are solid with said body.

9. A forming tool as claimed in claim 3, wherein each of said cavities defines, inwardly thereof, a predetermined decorative design.

10. A forming tool as claimed in claim 9, wherein said decorative design is shaped for the engraving of a water drop.

11. A forming tool as claimed in claim 3, wherein each of said engraving elements projects from said outer surface a distance at most equal to 40% of the thickness of a sheet to be engraved.

12. A forming tool as claimed in claim 3, wherein each of said engraving elements projects from said outer surface a distance equal to about 2 mm.

13. A forming tool as claimed in claim 3, wherein each of said engraving elements projects from said outer surface a distance equal to between 0.6 to 0.8 mm.

14. A forming tool as claimed in claim 11, wherein said engraving elements have, in cross-section, a major dimension at most equal to 60 mm.

15. A forming tool as claimed in claim 14, wherein said dimension is 20 mm.

16. A forming tool as claimed in claim 14, wherein said dimension is between 3 and 9 mm.

17. A forming tool as claimed in claim 3, wherein said body is selected from the class consisting of a roll, a press and a casting mould.

18. A forming tool as claimed in claim 3, wherein said body is made of metal.

19. A forming tool for producing an engraved motif on a sheet of material, said forming tool comprising:
a first roll;
a second roll having a plurality of radially outwardly projecting engraving elements of predetermined height distributed on its surface according to a predetermined spacial arrangement, each said engraving element having a radially outer face on which is formed an inward depression of predetermined depth, said second roll forming with said first roll a first gap for passage of said sheet of material; and
a third roll forming with said second roll a second gap for passage of said sheet of material.

20. A forming tool as claimed in claim 19, wherein said first and third rolls each have a substantially smooth surface.

21. A forming tool as claimed in claim 19, wherein said first, second and third rolls are arranged such that a strip of thermoplastic material may be passed through one of said first and second gaps and around said second roll through an angular range of at least 180° and thence through the other of said first and second gaps and around one of said first and third rolls whereby recesses formed in said thermoplastic material by the engraving elements on said second roll lie on the radially outwardly directed surface of said strip as it passes around said one of said first and third rolls.

22. A forming tool as claimed in claim 21, further comprising means for smoothing the surface of the strip of thermoplastic material.

23. A forming tool as claimed in claim 21, further comprising means for extruding a second strip of thermoplastic material and combining and smoothing said strips in said second gap.

* * * * *